Figure 1:
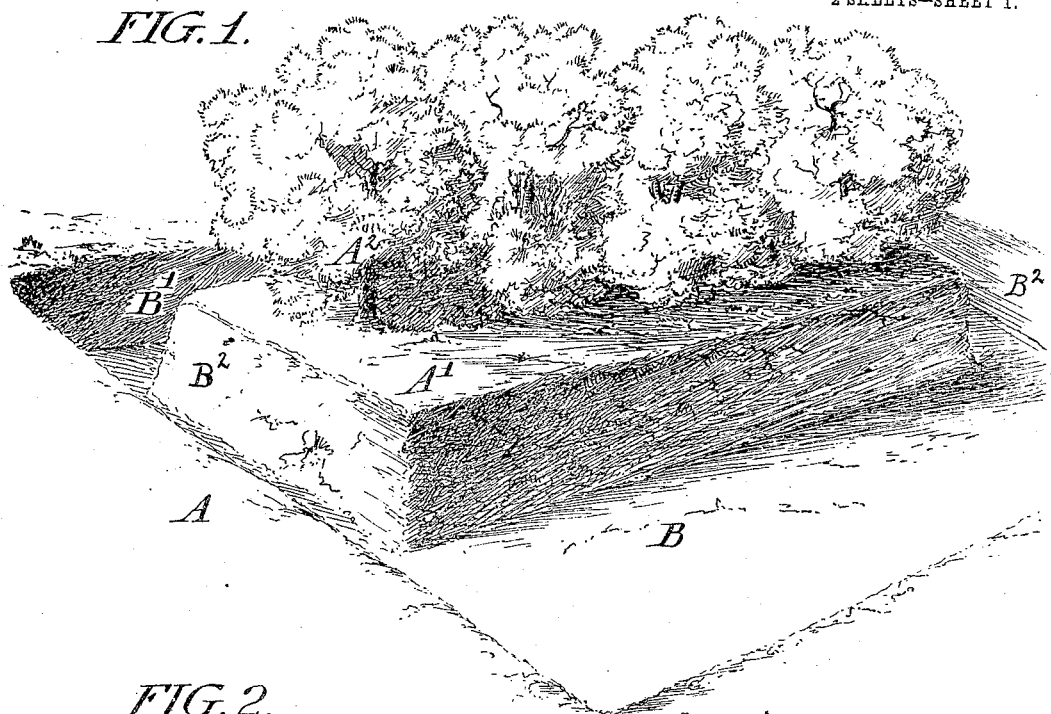

F. W. TAYLOR & H. VAN DUZEE.
APPARATUS FOR MOVING GROWING TREES AND THE LIKE.
APPLICATION FILED MAY 1, 1905.

944,522.

Patented Dec. 28, 1909.

2 SHEETS—SHEET 1.

WITNESSES:

INVENTORS:
Frederick W. Taylor
Harold Van Duzee
by Francis T. Chambers
their ATTORNEY.

F. W. TAYLOR & H. VAN DUZEE.
APPARATUS FOR MOVING GROWING TREES AND THE LIKE.
APPLICATION FILED MAY 1, 1905.
944,522.
Patented Dec. 28, 1909.
2 SHEETS—SHEET 2.
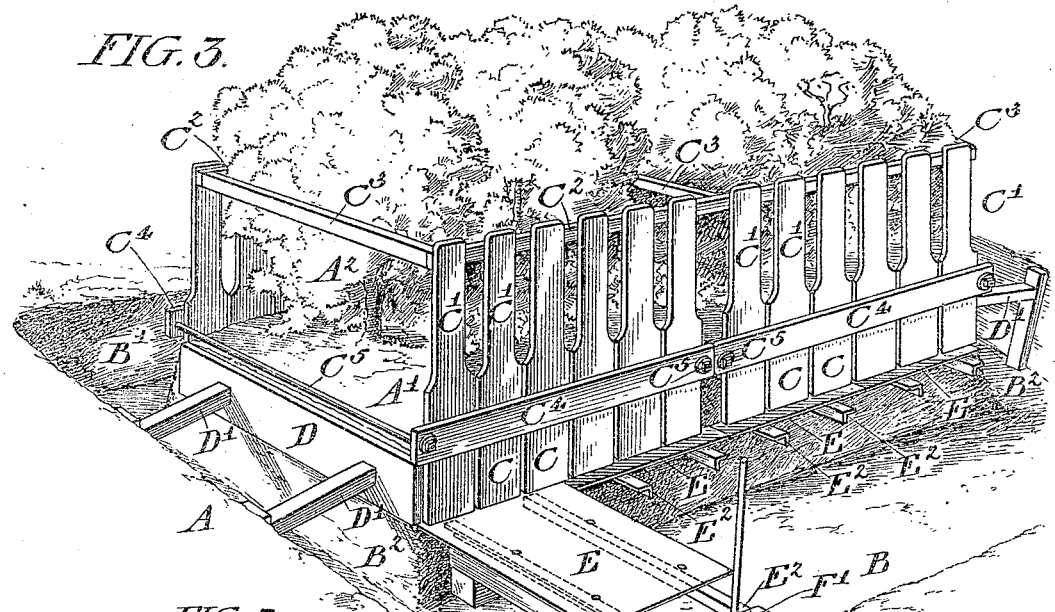
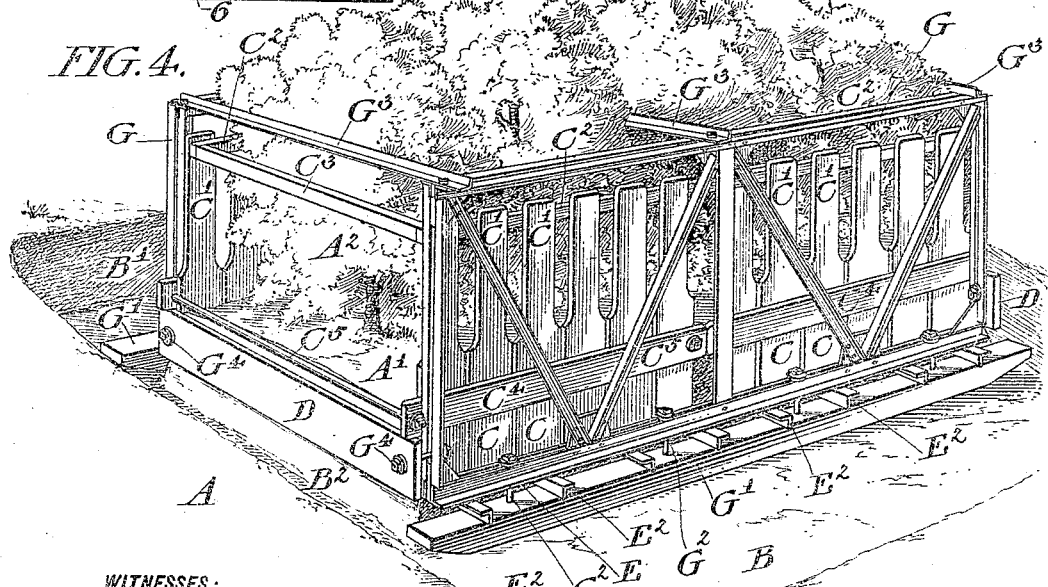
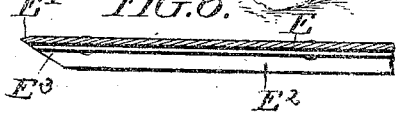

UNITED STATES PATENT OFFICE.

FREDERICK W. TAYLOR AND HAROLD VAN DUZEE, OF PHILADELPHIA, PENNSYLVANIA.

APPARATUS FOR MOVING GROWING TREES AND THE LIKE.

944,522.

Specification of Letters Patent.

Patented Dec. 28, 1909.

Application filed May 1, 1905. Serial No. 258,310.

*To all whom it may concern:*

Be it known that we, FREDERICK W. TAYLOR and HAROLD VAN DUZEE, both citizens of the United States of America, residing in the city and county of Philadelphia, in the State of Pennsylvania, have invented a certain new and useful Improvement in Apparatus for Moving Growing Trees and the Like, of which the following is a true and exact description, reference being had to the accompanying drawings, which form a part thereof.

Our invention relates to the art of transplanting growing trees and shrubbery and has for its object to provide simple and effective apparatus by which such growing trees and the soil in which they grow can be separated from the surrounding earth, moved and replanted with the least possible disturbance of the earth transplanted with the tree and in such a way that the soil on which the tree depends for sustenance can be separated from the barren sub-stratum of the earth with almost perfect accuracy.

In utilizing our invention, we dig out trenches on opposite sides of the growing tree, making one of said trenches of a breadth somewhat in excess of the bank of earth between the trenches. We then place horizontal guideways in the bottom of the broad trench and place upon them substantially flat stiffened plates which should have sharpened front edges and we then force these plates through the bank of earth beneath the trees by pressure exerted between their rear edges and the outer wall of the broad trench. Great pressure can be exerted in this way by the use of jacks or similar appliances and we have found that the horizontal guide plates will cut through the bank of earth substantially without deflection, cutting their way through heavy roots or even through quite large stones, or if the stones are of such a nature that the blades cannot cut through them they are frequently forced through the bank of earth in front of the plate without causing any deflection. After having forced the plate or plates beneath the growing tree until they extend out into the narrow trench, we then lift the plate with the bank of earth supported upon it and transport it to the place where it is designed to replant it, the plates being withdrawn after the bank of earth and growing tree is in place for which purpose of course it is advisable that the trench provided to receive the growing tree should be broad enough to permit the withdrawal of the plates by a substantial reversal of the operation employed for forcing them beneath the bank of earth.

Our invention comprises the device for moving growing trees, etc., which consists of a substantially flat stiffened plate with sharp front edge by which it is adapted for the use above described, and having preferably longitudinal ribs and appliances for holding the bank of earth in place and also for attachment to the plates so as to provide trusses to enable the bank of earth to be shifted without danger of such deflection as will cause it to break.

The nature of our improvements will be best understood as described in connection with the drawings which illustrate our operation for moving growing trees, and also the appliances which we have invented for use in connection with this operation.

Figure 2:
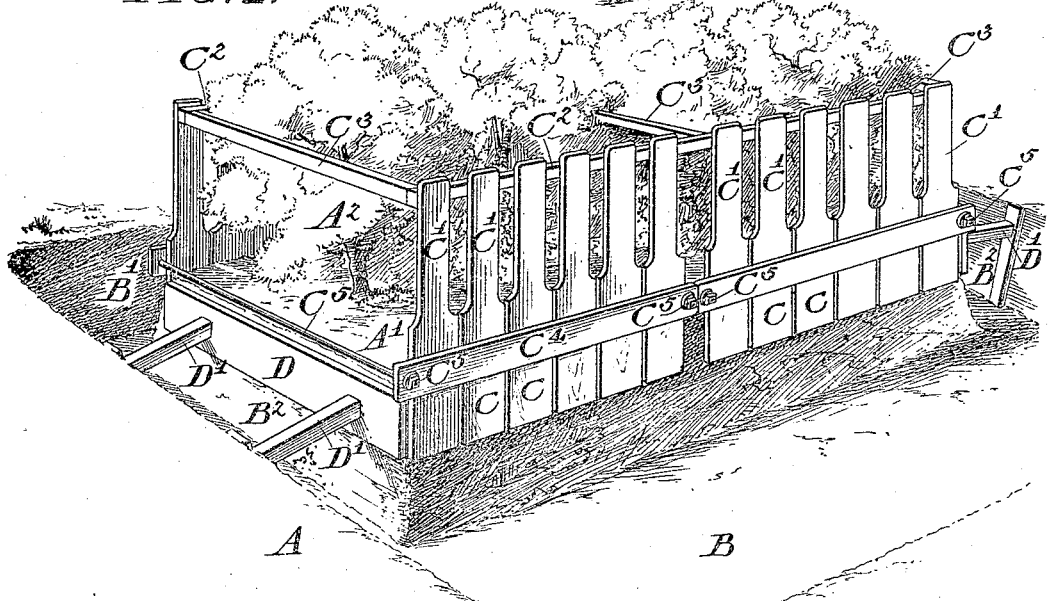

In these drawings, Figure 1, is a perspective view representing the trenching which is a preliminary step to the removal of the trees and connected bank of earth. Fig. 2, is a similar perspective view showing the clamping devices which are built for the purpose of holding the bank intact. Fig. 3, is a similar perspective view showing the operation and appliances for driving the flat plates beneath the bank of earth. Fig. 4, is a similar perspective view showing the truss attachments which are made after the bank of earth is severed from the ground and as a preliminary to moving it. Fig. 5, is a plan view of one of the flat plates and Fig. 6, a sectional view on the line 6—6 of Fig. 5.

A, indicates the level of the ground, B, the broad trench which is dug on one side of the tree or trees to be moved. B', the comparatively narrow trench which is dug on the other side of the tree or trees. $B^2$, $B^2$, end trenches which it is advisable should also be dug at the same time in order to entirely separate the bank of earth to be moved from the surrounding soil.

A', indicates the bank of earth in which the trees are growing, and $A^2$, the growing trees.

C C, C, etc., are clamping boards which are secured along the opposite sides of the bank A', with their upper ends C', extending well above the surface of the ground.

As shown these clamping boards are secured in groups to upper longitudinal boards C², and also longitudinal bars C⁴, and the clamping boards on opposite sides of the bank are connected at top by struts indicated at C³, C³, etc., and near the level of the ground by adjustable tie or clamping rods C⁵. It will readily be seen that in the construction shown the drawing up of the rod C⁵, by means of nuts at their ends, will draw the bars C, C, tightly against the bank of earth on the opposite sides thereof. We also prefer to provide abutment boards D, D, at the ends of the bank A', which in the preliminary stages of the operation can be held in place by struts as indicated at D', D'.

E, E, etc., indicate the narrow flat plates used for cutting through the bank of earth these plates as shown having their front edges sharpened and being stiffened by longitudinally extending angle irons E², the front edges E³, of which should also be sharpened. These ribs serve also as guides preventing sidewise movements of the plates while being driven into the earth.

F, indicates guideways or timbers which are placed in the broad trenches B, with their tops at the proper level at which it is designed that the bank A', should be severed from the subjacent earth. The plates E, are laid on the guides F, and, as shown, a bar F', placed against the rear ends of the angle irons E², a jack F², being then placed between the bars F', and the outer bank of the trench B, and operated for the purpose of forcing the plates E, forward in a horizontal plane so that they will cut through the bank A', until their front ends extend into the trench B'. The motion of the plates will, we have found, take place in the plane of the guideways F, and as we have already stated even very considerable obstacles will not effect any change in the direction in which the plate will travel and by using this appliance as described we are enabled to sever the soil from the subjacent earth with practical exactness so that all the valuable soil will remain attached to the roots of the trees and practically no worthless earth will require to be moved. A further advantage of our tool by which we are enabled to move with the tree substantially all the soil and nothing but the soil, is that, by preparing a new bed of soil in the new location for the tree the soil removed with the tree is set down on the new bed so that the roots of the tree can at once penetrate the new and rich soil. In this way a stimulus to the renewed growth is supplied.

Where the body of earth to be moved with a tree or trees is of considerable dimensions and weight it is advisable that the supporting plates which are to be moved with the earth should be stiffened and strengthened and for this purpose we provide the appliances shown in Fig. 4. Beams G', are placed beneath the ends of the angle irons E², and trusses G, G, are placed on top of the angle irons or plate on each side and secured to the beams G', as by bolts G², G², etc. The trusses on the opposite sides of the bank A, should be connected by distance pieces G³, G³, etc., and by preference the abutment boards D, D, should be clamped to the trusses as by bolts G⁴. It will readily be seen that by the attachment of the trusses to plates E, they are practically incorporated into a bridge like truss and that the whole structure including the earth supported on the plates can be raised and transported by any convenient mechanism or appliances with practically no risk of any breaking or disturbance of the bank of earth to be moved.

We have referred to the motion of the cutting plate being in a horizontal plane, and such will almost always be the case, but the central idea in severing the tree bearing soil from the subjacent earth is to remove with the tree the true soil in which it grows without adhering non-fertile earth and the line of motion of the plate should be parallel to the plane of separation between such soil and earth.

Having now described our invention, what we claim as new and desire to secure by Letters Patent is—

1. As a device for moving growing trees and the like, a substantially flat stiffened plate having a sharp front edge and adapted to be forced in a horizontal plane through the earth beneath the tree in combination with detachable trusses secured to the edges of the plate after it has penetrated the earth beneath the tree.

2. As a device for moving growing trees and the like, a substantially flat stiffened plate having a sharp front edge and adapted to be forced in a horizontal plane through the earth beneath the tree in combination with means for holding the earth in place above the plate consisting of one or more pairs of clamps extending upward on both sides of the earth to be moved from at or about the level of the plate said clamps having struts extending between their upper ends and tie rods connecting them near the level of the ground.

3. As a device for moving growing trees and the like a substantially flat stiffened plate having a sharp front edge and adapted to be forced in a horizontal plane through the earth beneath the tree, in combination with detachable trusses secured to the edges of the plate after it has penetrated the earth beneath the tree with means for holding the earth in place above the plate consisting of one or more pairs of clamps extending upward on both sides of the earth to be moved from at or about the level of the plate said clamps having struts extending between their upper ends and tie rods connecting them near the level of the ground.

4. As a device for moving growing trees and the like, a substantially flat stiffened plate having a sharp front edge and longitudinally running ribs so placed as to engage the earth as the plate is drawn through it and thus to prevent lateral motion of the plate.

FRED. W. TAYLOR.
HAROLD VAN DUZEE.

Witnesses:
ARNOLD KATZ,
D. STEWART.